(12) United States Patent
Simon et al.

(10) Patent No.: US 12,273,266 B2
(45) Date of Patent: Apr. 8, 2025

(54) MOBILE CORE CLOUD CONNECTION ROUTER

(71) Applicant: AT&T Intellectual Property I, L.P., Atlanta, GA (US)

(72) Inventors: Sean Simon, Lynnwood, WA (US); Aman Deep Gill, Mill Creek, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 32 days.

(21) Appl. No.: 17/823,061

(22) Filed: Aug. 29, 2022

(65) Prior Publication Data

US 2024/0073130 A1    Feb. 29, 2024

(51) Int. Cl.
*H04L 45/586* (2022.01)
*H04L 12/46* (2006.01)
*H04L 45/00* (2022.01)

(52) U.S. Cl.
CPC ........ *H04L 45/586* (2013.01); *H04L 12/4633* (2013.01); *H04L 45/38* (2013.01)

(58) Field of Classification Search
CPC .... H04L 45/586; H04L 12/4633; H04L 45/38
See application file for complete search history.

(56) References Cited

U.S. PATENT DOCUMENTS

| | | | | |
|---|---|---|---|---|
| 8,804,494 B1 * | 8/2014 | Uberoy | ............... | H04L 41/0663 370/219 |
| 11,159,366 B1 * | 10/2021 | Gawade | ............... | H04L 41/0895 |
| 2007/0217338 A1 * | 9/2007 | Wang | ....................... | H04L 12/66 370/252 |
| 2012/0239966 A1 * | 9/2012 | Kompella | ............. | H04W 24/04 714/E11.073 |
| 2014/0362790 A1 * | 12/2014 | McCann | ............... | H04L 45/308 370/329 |
| 2015/0071053 A1 * | 3/2015 | Kempf | ................... | H04W 24/02 370/216 |
| 2015/0326471 A1 * | 11/2015 | Anandan | ............. | H04L 12/4633 370/228 |
| 2018/0006844 A1 * | 1/2018 | McAndrew | ........... | H04W 40/00 |

(Continued)

OTHER PUBLICATIONS

"3rd Generation Partnership Project; Technical Specification Group Services and System Aspects; System architecture for the 5G System (5GS); Stage 2," 3GPP TS 23.501, V16.7.0, Dec. 2020, 450 pages.

(Continued)

*Primary Examiner* — Chris Parry
*Assistant Examiner* — Dixon F Dabipi
(74) *Attorney, Agent, or Firm* — GUNTIN & GUST, PLC; Atanu Das

(57) ABSTRACT

Respective implementations facilitating a mobile core connection router are provided. A method can include establishing, by a system comprising a processor, a connection to a virtualized core network instance, associated with a first computing device, via a mobility tunneling protocol; in response to the establishing of the connection, initializing, by the system, a virtualized router function based on a routing table; and routing, by the system and via the virtualized router function, data traffic between the virtualized core network instance and a second computing device, communicatively coupled to the system and distinct from the first computing device.

20 Claims, 10 Drawing Sheets

(56) References Cited

U.S. PATENT DOCUMENTS

2019/0007236 A1* 1/2019 Ishii .................... H04L 12/4633
2019/0104458 A1* 4/2019 Svennebring ........... H04L 45/42

OTHER PUBLICATIONS

"Universal Mobile Telecommunications System (UMTS); LTE; 5G; 3GPP Evolved Packet System (EPS); Evolved General Packet Radio Service (GPRS) Tunnelling Protocol for Control plane (GTPv2-C); Stage 3," 3GPP TS 29.274 version 16.11.0 Release 16, Mar. 2022, 420 pages.

* cited by examiner

MOBILE CORE CLOUD CONNECTION ROUTER

TECHNICAL FIELD

The present disclosure relates to communication networks, and, in particular, to techniques for routing data associated with a cloud-implemented mobile core network.

BACKGROUND

Traditionally, connectivity between mobile subscribers and/or cellular backhaul for mobility infrastructure connectivity is realized via live Radio Access Network (RAN) equipment. In the example of a traditional enterprise network, a subscriber connects to an Access Point Name (APN) associated with live network equipment (e.g., hosted on the enterprise premises) for a desired use case, such as Internet of Things (IoT) use cases, generic infrastructure mobility connectivity, or the like. However, advancements in network and computing technology have enabled mobile core network elements to be emulated or virtualized, e.g., such that a virtual core network instance can be implemented via a cloud computing platform. As a result, a technology integration challenge exists with the migration of enterprise legacy mobility applications to cloud platforms, as legacy solutions tend to be inflexible, costly, and highly dependent upon legacy telecommunications architectures.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a method as described herein can include establishing, by a system including a processor, a connection to a virtualized core network instance, associated with a first computing device, via a mobility tunneling protocol. The method can further include, in response to the establishing of the connection, initializing, by the system, a virtualized router function based on a routing table. The method can also include routing, by the system and via the virtualized router function, data traffic between the virtualized core network instance and a second computing device, communicatively coupled to the system and distinct from the first computing device.

In another aspect, a system as described herein can include a processor and a memory that stores executable instructions that, when executed by the processor, facilitate performance of operations. The operations can include connecting, via a mobility tunneling protocol, the system to a virtual core network instance implemented by a first computing device. The operations can also include, in response to the connecting, initializing a virtual router function based on a routing table. The operations can additionally include routing, via the virtual router function, network traffic between the virtual core network instance and a second computing device, communicatively coupled to the system and distinct from the first computing device.

In a further aspect, a non-transitory machine-readable medium as described herein can include executable instructions that, when executed by a processor of a first device, facilitate performance of operations. The operations can include establishing a connection between the first device and a virtual packet core instance, instantiated on a second device that is distinct from the first device, via a mobility tunneling protocol; in response to the establishing of the connection being determined to be successful, activating a virtual router function at the first device; and routing, via the virtual router function, user plane traffic between the virtual packet core instance and a third device that is communicatively coupled to the first device.

Figure 1:
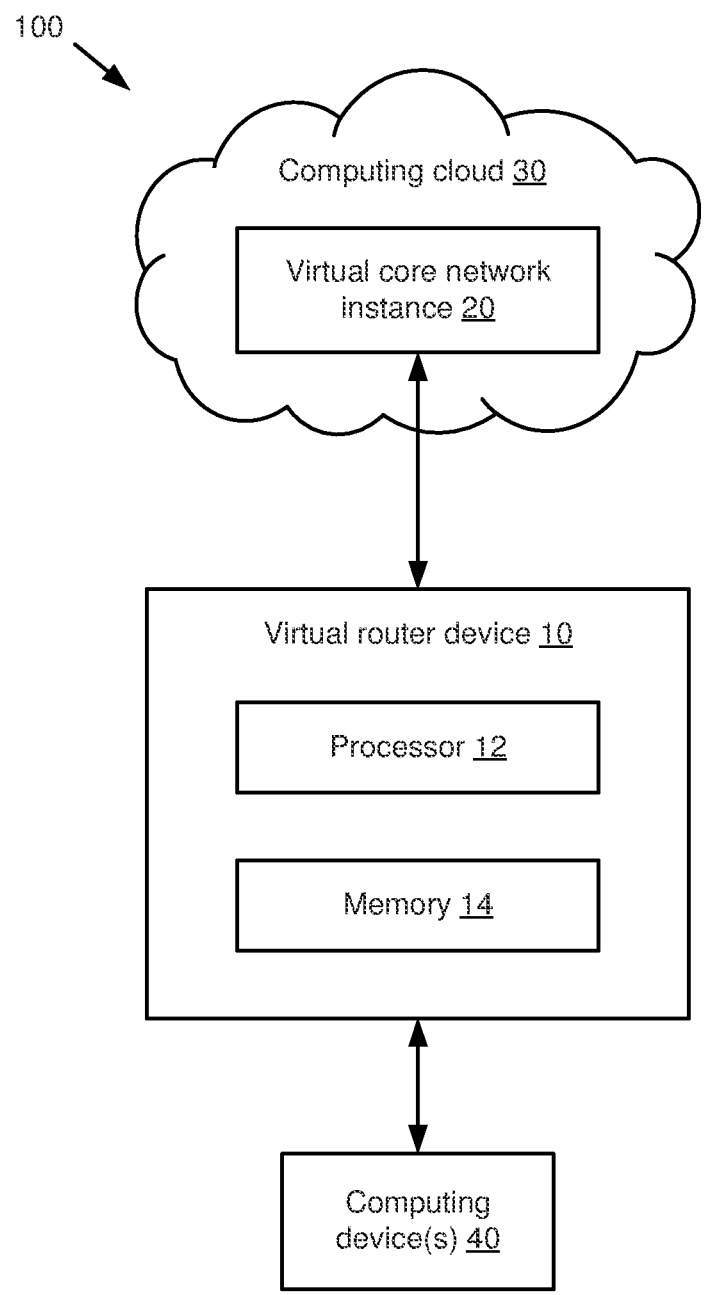
FIG. 1 is a block diagram of a system that facilitates a mobile core cloud connection router in accordance with various aspects described herein.

Referring first to FIG. 1, a system 100 that facilitates a mobile core cloud connection router is illustrated. System 100 as shown by FIG. 1 includes a virtual router device 10 that can facilitate establishment of a connection to a virtual core network instance 20, e.g., as implemented via a cloud service associated with a computing cloud 30. The virtual router device 10 can be any suitable computing device, such as a server, a desktop workstation, or the like, having the capability to route network connections, e.g., according to a routing table as further described below with respect to FIG. 3, between the virtual core network instance 20 and one or more computing devices 40 that are communicatively coupled to the virtual router device 10. In various implementations, the computing cloud 30 can be associated with a public cloud computing platform, such as Microsoft Azure, Amazon Web Services, Google Cloud, and/or any other platforms currently existing and/or developed in the future. Additionally, while the virtual router device 10 is shown in FIG. 1 as a standalone device, it is noted that the virtual router device 10 could also be implemented via one or more devices associated with a computing cloud (not shown), e.g., a computing cloud that is distinct from the computing cloud 30 in which the virtual core network instance 20 is implemented.

The virtual core network instance 20 shown in FIG. 1 can implement some or all of the functionality of an Evolved Packet Core (EPC), and/or other mobility network elements, through resources enabled via the computing cloud 30 without utilizing live network hardware. As noted above, mobile subscribers and infrastructure traditionally terminate in data centers and/or on-premises equipment such as purpose-built network gateway devices. In contrast, the virtual core network instance 20 can include EPC core gateway elements that are deployed, e.g., into public cloud subscriptions with reachability into the regional packet core and RAN assets.

In an aspect, the virtual router device 10 can operate as described herein, in combination with cloud-implemented network elements, to route between EPC packet core resources in public and/or private clouds within the need for live RAN assets while still allowing for connectivity into the same application environments as mobile subscribers. By way of specific, non-limiting example, an enterprise shipping company can utilize a virtual router device 10 as described herein to connect their trucking fleet into applications hosted in a public computing cloud, e.g., computing cloud 30, as well as to connect service assurance tools, provisioning tools, or the like, that are hosted in various public cloud locations. In this example, a software-based router can be created (e.g., via the virtual router device 10) from one cloud that can terminate as a mobile subscriber in an EPC hosted in another public cloud using mobility infrastructure protocols. Such an implementation can enable connectivity between cloud tenants, EPC user plane and/or application behind mobile, as well as the potential to share routing tables between the two cloud tenants without utilizing live RAN assets.

In implementations such as that shown by FIG. 1 in which a virtual core network instance 20 is deployed in a computing cloud 30, applications in the user plane are generally not reachable or exposed without creating routing solutions in the user plane. However, these solutions can be complicated or complex if they are individually engineered for each cloud deployment scenario. In addition, redundancy, resiliency, and connectivity can be equally difficult to engineer in user plane Virtual Routing and Forwarding (VRF) instances. In contrast, the virtual router device 10 enables the migration of enterprise legacy mobility applications to public cloud platforms with improved flexibility, reduced cost and complexity, and reduced dependency on legacy data and/or telecommunication architectures.

In various implementations as described herein, the virtual router device 10 can establish a connection to a virtual core network instance 20 according to any suitable mobility (cellular) communication protocol, such as a Fourth Generation (4G) Long Term Evolution (LTE) protocol, a Fifth Generation (5G) New Radio (NR) protocol, and/or any other protocols either presently existing or developed in the future. To the extent that respective implementations described herein are described with reference to a particular communication protocol or technology, it is noted that such references are provided merely by way of example and that other protocols and/or technologies could also be used without departing from the scope of the description or the claimed subject matter.

Similarly, a connection between the virtual router device 10 and the computing devices 40 shown in FIG. 1 could utilize a cellular communication protocol that is the same as, or different from, the protocol used to connect the virtual router device 10 to the virtual core network instance 20. Also or alternatively, a connection between the virtual router device 10 and the computing devices 40 could be established using any other suitable wired and/or wireless communication protocol, e.g., Wireless Fidelity (Wi-Fi), BLUETOOTH®, or the like.

As further shown in FIG. 1, the virtual router device 10 of system 100 can include a processor 12 and a memory 14, which can be utilized to facilitate various functions of the virtual router device 10. For instance, the memory 14 can include a non-transitory computer readable medium that contains computer executable instructions, and the processor 12 can execute instructions stored by the memory 14. For simplicity of explanation, various actions that can be performed via the processor 12 and the memory 14 of the virtual router device 10 are shown and described below with respect to various logical components. In an aspect, the components described herein can be implemented in hardware, software, and/or a combination of hardware and software. For instance, a logical component as described herein can be implemented via instructions stored on the memory 14 and executed by the processor 12. Other implementations of various logical components could also be used, as will be described in further detail where applicable.

Figure 2:
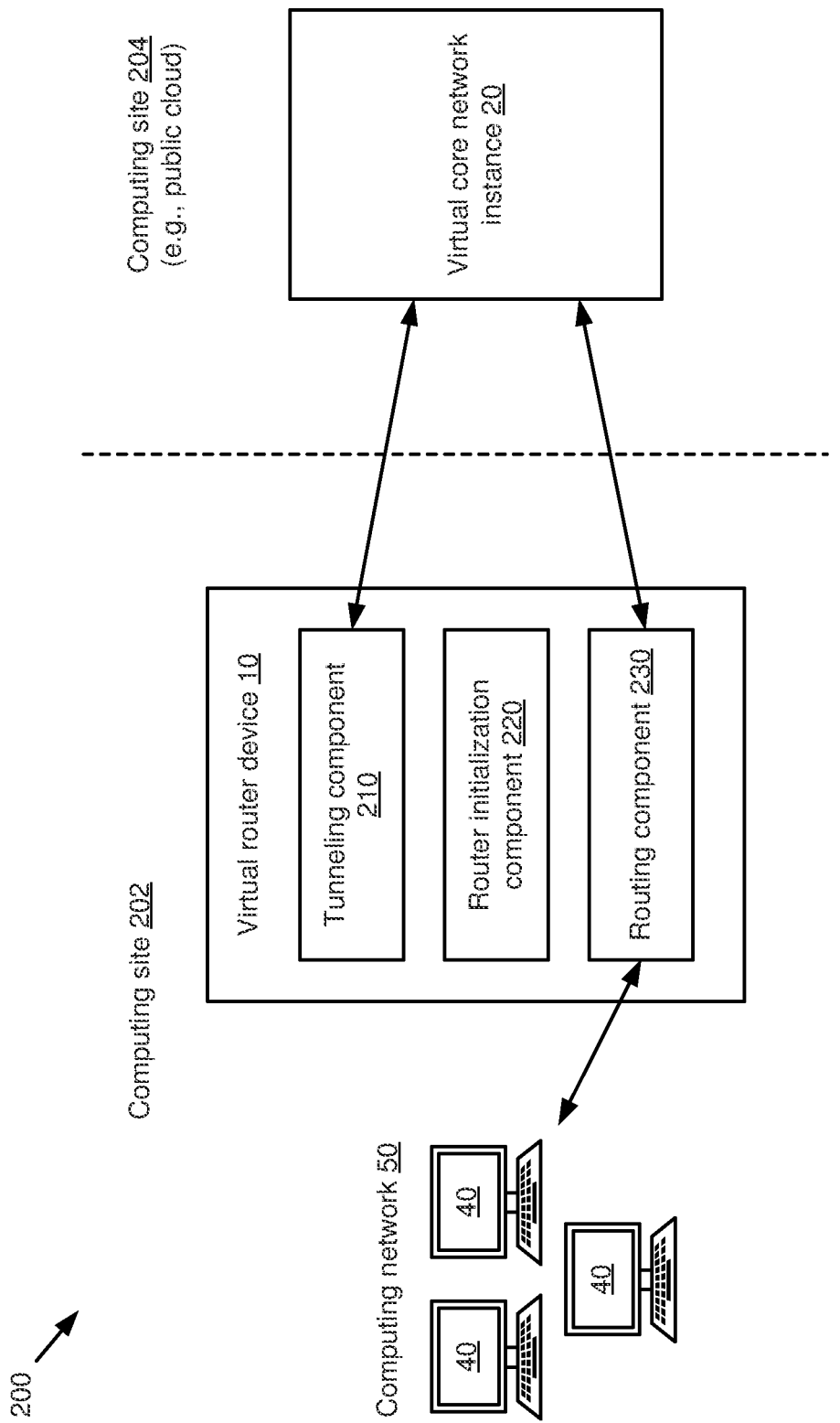
FIG. 2 is a block diagram that depicts the functionality of the virtual router device of FIG. 1 in further detail in accordance with various aspects described herein.

With reference now to FIG. 2, a block diagram of a system 200 that facilitates a mobile core cloud connection router is illustrated. Repetitive description of like elements employed in other embodiments described herein is omitted for brevity. System 200 as shown in FIG. 2 includes a virtual router device 10 that can operate in a similar manner to that described above with respect to FIG. 1. The virtual router device 10 shown in system 200 is physically located at, and/or otherwise associated with, a computing site 202 (e.g., a computing site associated with a public or private cloud) that additionally includes a computing network 50 composed of respective computing devices 40 that are communicatively coupled to the virtual router device 10. While three computing devices 40 are shown in FIG. 2 for purposes of illustration, it is noted that the computing network 50 could include any suitable number of computing devices 40, including one computing device 40 or multiple computing devices 40.

As further shown in FIG. 2, the virtual router device 10 includes a tunneling component 210 that can establish a connection to a virtual core network instance 20 (e.g., a virtual EPC instance, a virtual packet core instance, etc.) via a mobility tunneling protocol, e.g., the GPRS (General Packet Radio Service) Tunneling Protocol (GTP). In an implementation, the virtual core network instance 20 can be a Mobile Packet Core instance that is deployed into a public or private cloud instance, e.g., a cloud instance associated with a computing site 204 that is separate from the computing site 202 associated with the virtual router device 10. The virtual core network instance 20, once instantiated, can accept incoming connectivity requests from mobility subscribers (e.g., mobility devices, IoT cellular connections, fixed wireless subscriber devices, etc.) for the purpose of exposing applications and/or services to the mobile subscriber base. Subsequently, the tunneling component 210 can instantiate a software-based emulated connection for the purpose of connecting to the Mobile Packet Core environment. This connectivity can occur, e.g., based on a Third Generation Partnership Project (3GPP)-based transport technology such as LTE or 5G and/or any other suitable transport technology.

The virtual router device 10 of system 200 additionally includes a router initialization component 220, which, in response to the tunneling component 210 10 establishing a connection with the virtual core network instance 20 as described above, can initialize a virtualized router function for routing traffic between the computing devices 40 of the computing network 50 and the virtual core network instance 20. A virtualized router function via the router initialization component 220 can be based on a routing table, e.g., as described in further detail below with respect to FIG. 3.

The virtual router device 10 of system 200 further includes a routing component 230, which can route data traffic (e.g., user plane data traffic) between the virtual core network instance 20 and the computing devices 40 of the computing network 50 via the virtual router function established by the router initialization component 220. Once implemented, the virtual router function utilized by the routing component 230 can allow for tunneled transport between the computing network 50 and the virtual core network instance 20 using mobility infrastructure as a transport. This, in turn, enables the virtual router device 10 to perform routing as a network-behind-emulated (simulated) mobile functioning as a software-based routing function.

The virtual router device 10 of system 200, by using a cloud connection via GTP, can enable the computing devices 40 of the computing network 50 to reach user plane applications without the use of user plane private circuit provisioning (e.g., via live network gateway hardware and/or other hardware components) in a manner that can be quickly engineered on demand. Additionally, by emulating live RAN resources, clients associated with the virtual router device 10 can exist in their own cloud instances as long as reachability exists (e.g., via the internet or requested connectivity within cloud service providers). Additionally, the virtual router device 10 of system 200 can leverage the inherent and mature capabilities for subscriber management when provisioning connections between cloud resources rather than building out additional resources, e.g., for firewalling, rate limiting, policy enforcement, security, or the like.

Figure 3:
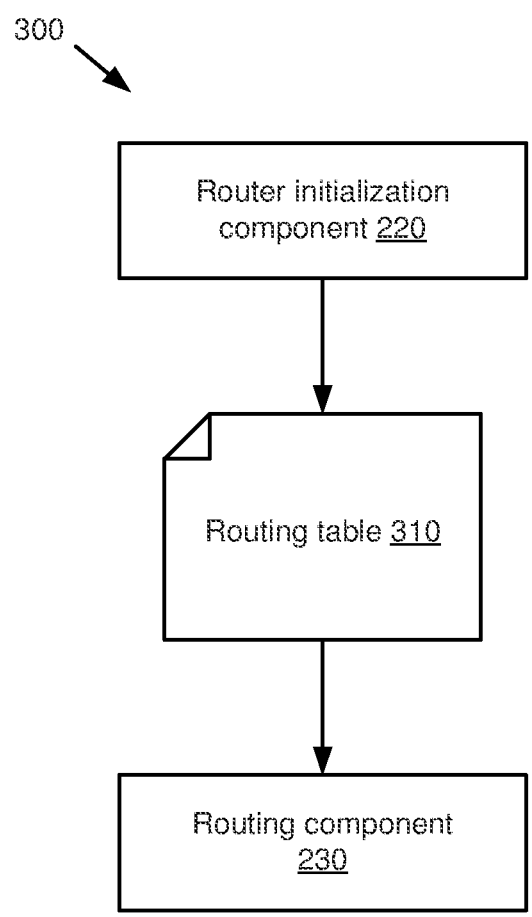
FIG. 3 is a block diagram of a system that facilitates router function initialization for a mobile core cloud connection router in accordance with various aspects described herein.

Turning next to FIG. 3, a block diagram of a system 300 that facilitates router function initialization for a mobile core cloud connection router is illustrated. Repetitive description of like elements employed in other embodiments described herein is omitted for brevity. As shown in FIG. 3, a router initialization component 220 of system 300 can initialize a virtual routing function, e.g., at a virtual router device 10 (not shown in FIG. 3) and/or another suitable device, as described above with respect to FIG. 2. As further shown in FIG. 3, the router initialization component 220 can generate, and/or otherwise provide, a routing table 310 to a routing component 230 to enable the routing component 230 to route between network locations and/or interfaces.

In an implementation, the routing table 310 shown in FIG. 3 can be at least partially constructed by the router initialization component 220 and/or other components, such as the tunneling component 210 shown in FIG. 2, from address and/or routing information associated with a desired network endpoint, e.g., the virtual core network instance 20 shown in FIG. 2. For instance, the routing component 230 can operate to provide connectivity for the purpose of exposing client-side applications in the user plane, which corresponds to an address and/or routing table that is reachable by incoming mobility subscribers. While this table is not normally exposed in-band, some or all information corresponding to this table can be incorporated into the routing table 310 via route leaking, e.g., a synthetic client attach in the form of a probe or attaching as a mobile device. Other techniques for constructing the routing table 310 could also be used.

In an implementation in which system 300 is associated with an enterprise, system 300 can be deployed to a given cloud service provider and initiate, via the router initialization component 220, a GTP protocol router connection to a remote EPC instance (e.g., the virtual core network instance 20 shown in FIG. 2) for the purpose of connecting applications and/or subscriber populations. Due to the inherent EPC nature of subscriber management, policy, enforcement, and charging, connections can be properly controlled on the basis of existing 4G and/or 5G EPC elements. This control can leverage network properties and/or characteristics such as Average Bitrate (ABR), Guaranteed Bitrate (GBR), Guaranteed Flow Bitrate (GFBR), or Maximum Flow Bitrate (MFBR); Quality Class Indicator (QCI) and/or Quality Flow Indicator (QFI) International Mobile Subscriber Identity (IMSI); Mobile Station Integrated Services Digital Network (MSISDN); Access Point Name (APN) and/or Data Network Name (DNN); logical subscriber population characteristics within the Policy and Charging Rules Function (PCRF) and policy framework; source and/or destination; mobility security authentication methods; or the like. Once a cloud instance is connected to the EPC core, the routing component 230 can enable applications in the routing table 310 to access the EPC user plane table specific to the APN (for LTE) or DNN (for 5G), or the user population being served by that EPC instance if mobile terminating flows are allowed.

Figure 4:
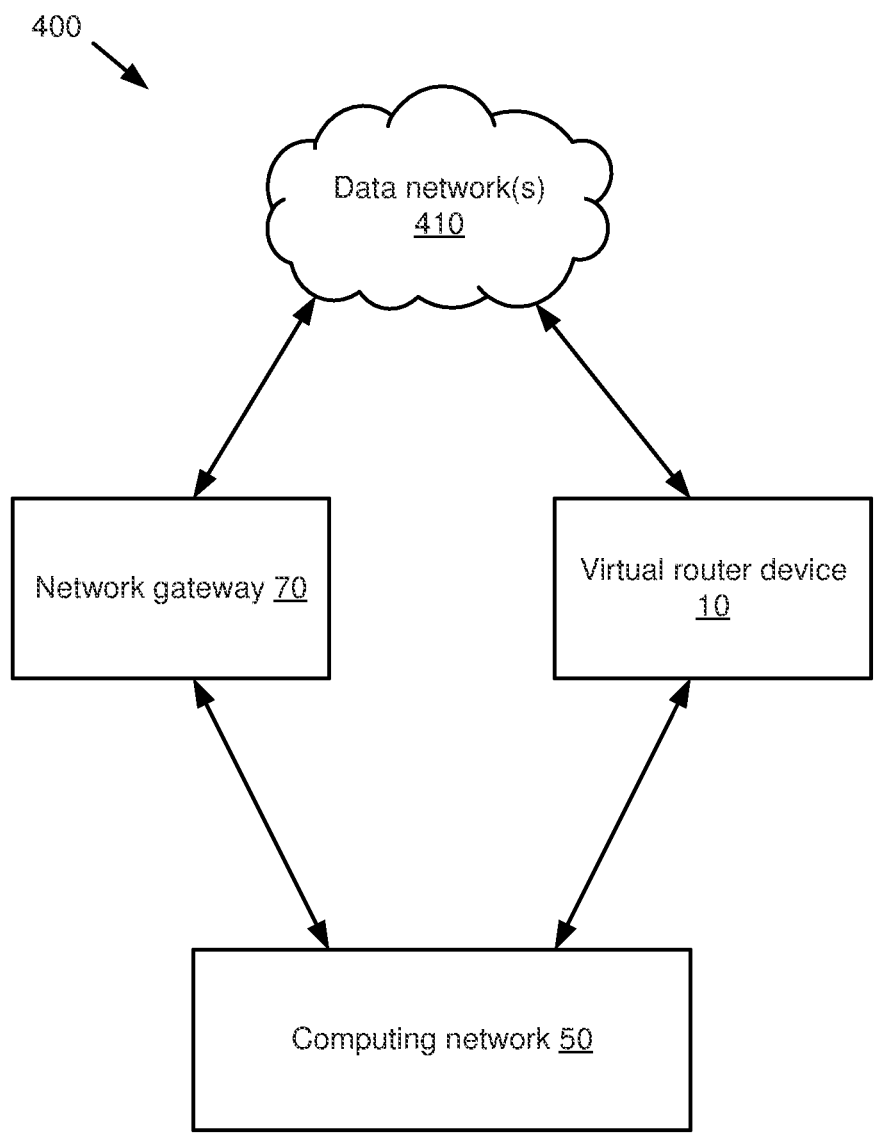
FIG. 4 is a block diagram of a system that facilitates routing data between a mobile data network and a computing network in accordance with various aspects described herein.

With reference now to FIG. 4, a block diagram of a system 400 that facilitates routing data between a mobile data network 410 and a computing network 50 is illustrated. Repetitive description of like elements employed in other embodiments described herein is omitted for brevity. System 400 as shown in FIG. 4 includes a virtual router device 10, which can operate to facilitate a connection between a computing network 50 and one or more data networks 410, e.g., a data network associated with a virtual core network instance 20 (not shown in FIG. 4), as described above.

As further shown in FIG. 4, system 700 includes a network gateway 70, e.g., which can be implemented according to various techniques known in the art and share a routing table (e.g., a routing table 310 as shown in FIG. 3) with the virtual router device 10. The virtual router device 10 of system 400, in combination with the network gateway 70, can provide redundant connection capability for respective computing nodes of the computing network 50. In an implementation as shown by FIG. 4, nodes of the computing network 50 can utilize a designated default gateway, which can be either the virtual router device 10 or the network gateway 70. In such an implementation, route selection can occur based on "administrative distance" within the routing table shared by the virtual router device 10 and the network gateway 70 to determine an appropriate path or next-hop candidate.

Figure 5:
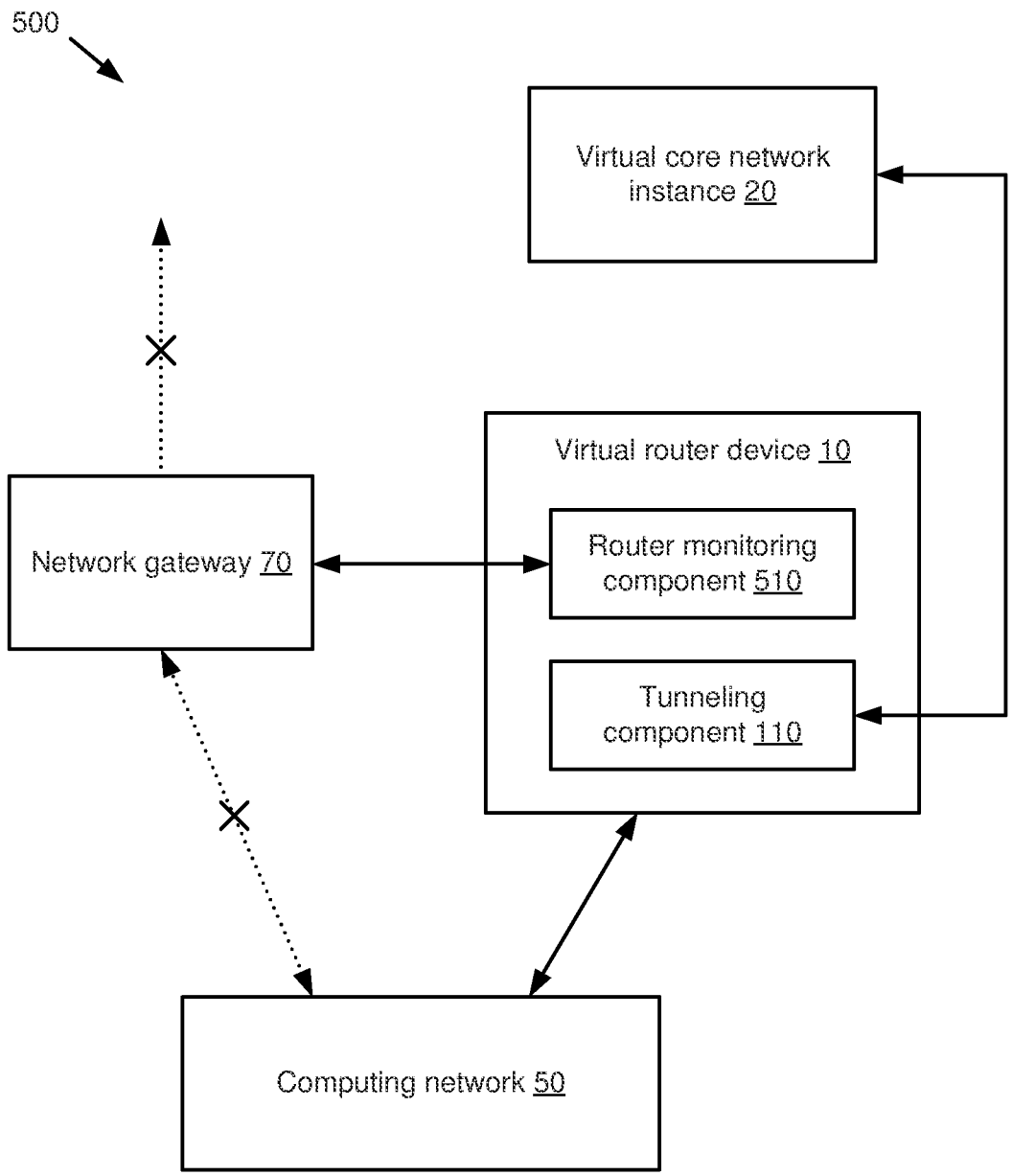
FIG. 5 is a block diagram that facilitates backup routing functionality via a mobile core cloud connection router in accordance with various aspects described herein.

As further shown by system 500 in FIG. 5, in the event that the network gateway 70 provides default routing for the computing network 50, the virtual router device 10 can provide backup transport for user plane egress in the event that the network gateway 70 becomes compromised. To this end, the virtual router device 10 of system 500 includes a router monitoring component 510 that can monitor an operational status of the network gateway 70, e.g., with respect to throughput, packet loss, or other criteria. In the event that the router monitoring component 510 identifies a degradation in the performance of the network gateway 70 (e.g., based on a throughput or other performance metric of the network gateway 70 falling below a threshold), the router monitoring component 510 can cause the tunneling component 210 of the virtual router device 10 to establish a connection with a virtual core network instance 20, e.g., as described above.

The virtual core network instance 20 to which the virtual router device 10 connects as shown in FIG. 5 can be the same instance, or a different instance, from that associated with the network gateway 70. By connecting the virtual router device 10 to the virtual core network instance 20 as shown in FIG. 5, the virtual router device 10 can be a secondary router that is created and injected as a secondary next-hop candidate for the user plane routing table.

Figure 6:
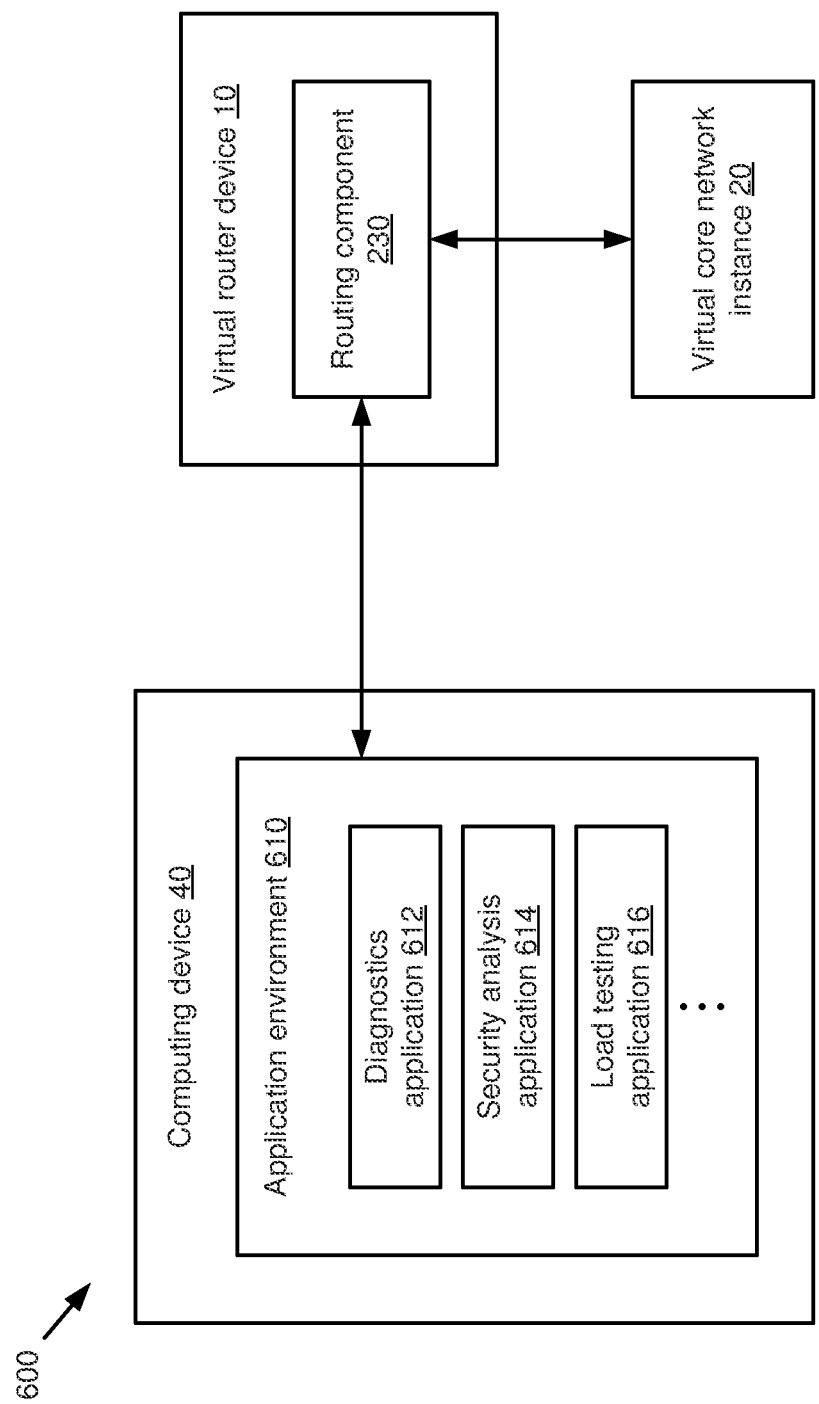
FIG. 6 is a block diagram of a system that facilitates routing data traffic associated with an application environment in accordance with various aspects described herein.

Turning next to FIG. 6, a block diagram of a system 600 that facilitates routing data traffic associated with an application environment 610 is illustrated. Repetitive description of like elements employed in other embodiments described herein is omitted for brevity. System 600 as shown in FIG. 6 includes a virtual router device 10, which can route data traffic between a computing device 40 and a virtual core network instance 20 via a routing component 230 as described above. Here, data traffic routed by the virtual router device 10 can be user plane data traffic associated with an application environment 610 running on, or otherwise enabled by, the computing device 40. The application environment 610 shown in system 600 can include respective applications, such as a diagnostics application 612, a security analysis application 614, and a load testing application 616, each of which are described in further detail below. It is noted that other applications could also be associated with the application environment 610 in addition to, or in place of, the applications 612-616 shown in FIG. 6.

In an implementation, the virtual router device 10 can facilitate tunneling between network endpoints (e.g., the virtual core network instance 20 and the computing device 40) via mobility-specific protocols. In another implementation in which the computing device 40 is associated with a cloud-based computing cluster, the virtual router device 10 can facilitate routing between the respective cloud instances associated with the computing device 40 and the virtual core network instance 20, e.g., for the purpose of exposing the application environment 610 between the cloud instances.

The diagnostics application 612 shown in FIG. 6 can provide qualitative assessment of user experience, network health, and/or other parameters. By way of non-limiting example of an enterprise that utilizes redundant network connections via mobility, the diagnostics application 612 can enable the enterprise, through the virtual router device 10, to perform a simulated attach to the virtual core network instance 20 and validate network pathing and/or infrastructure. To this end, the diagnostics application 612 could attach as a mobile and perform respective tests to determine, e.g., that primary and/or secondary network paths are reachable as a mobile and that the health of said paths are adequate. As another example, the diagnostics application 612 can enable testing as a mobile device to the exposed user plane environment in order to facilitate service assurance testing as well as assessment and/or diagnostics of user experience.

The security analysis application 614 shown in FIG. 6 can facilitate service vulnerability assessment scanning of the user plane as a mobile device. In general, EPC APNs, such as those associated with the virtual core network instance 20, are their own routing tables (e.g., enabled via virtual routing and forwarding or VRF) to which vulnerability assessment tooling traditionally lacks access. By utilizing a simulated mobile attach via the virtual router device 10, the security analysis application 614 can support non-credentialed vulnerability assessment scanning, e.g., for security purposes.

The load testing application 616 shown in FIG. 6 can facilitate load testing of the user plane application environment, e.g., the application environment 610. By simulating portions of the mobility infrastructure, the virtual router device 10 can simulate large-scale routing between respective cloud instances in order to enable the use of the application environment 610 at scale, thereby facilitating load testing via the load testing application 616 at the cloud instance level.

Figure 7:
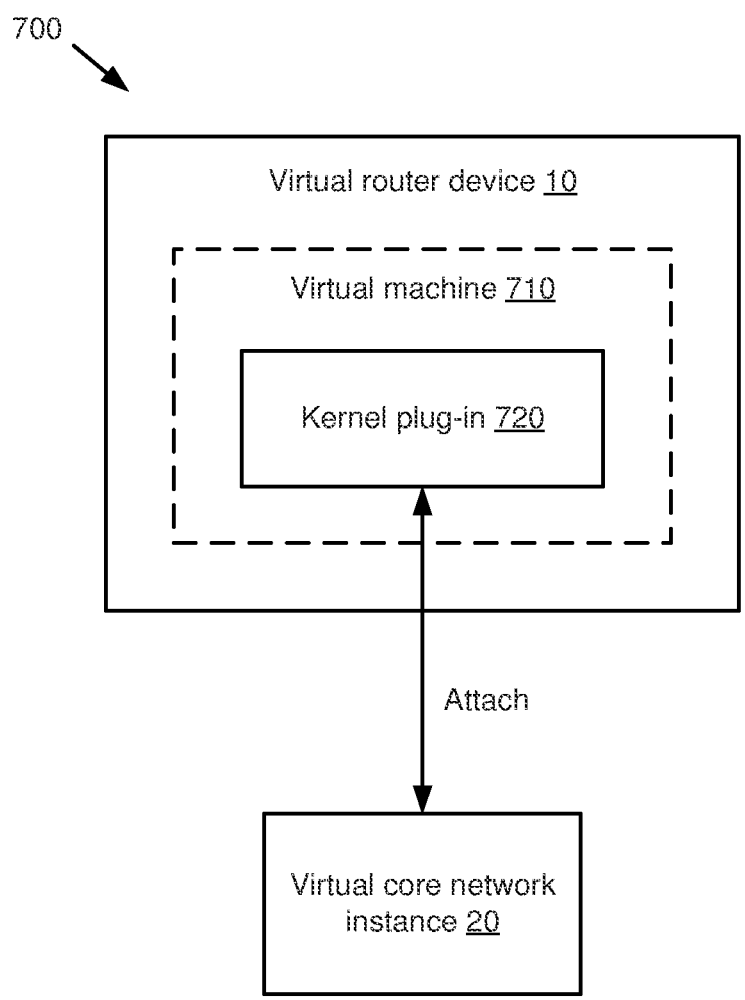
FIG. 7 is a block diagram of a system that facilitates a mobile core cloud connection router via a virtual machine and a kernel plug-in in accordance with various aspects described herein.

Referring next to FIG. 7, a block diagram of a system 700 that facilitates a mobile core cloud connection router via a virtual machine (VM) 710 and a kernel plug-in 720 is illustrated. Repetitive description of like elements employed in other embodiments described herein is omitted for brevity. System 700 as shown in FIG. 7 includes a virtual router device 10 onto which a VM 710 associated with a kernel plug-in 720 is deployed. The kernel plug-in 720, via the VM 710, can implement some or all of the functionality of the tunneling component 210, router initialization component 220, and/or routing component 230 as described above.

In an implementation, the kernel plug-in 720 can be utilized to modify an existing host associated with the VM 710 (e.g., a UNIX host, etc.) in order to enable attachment to a virtual core network instance 20 as a mobile subscriber. For instance, the kernel plug-in 720 can submit a connectivity request associated with an attach that utilizes mobility protocol tunnels and represents the virtual router device 10 as a mobile subscriber device and/or otherwise is performed in a similar manner to an attach performed by such a device. This, in turn, can enable large clustered solutions connected via the kernel plug-in 720 to appear on the mobility infrastructure as a single subscriber.

An example procedure that can be utilized by the virtual router device 10 of system 700 to attach to a virtual core network instance 20 can proceed as follows. It is noted, however, that the following procedure represents merely one way in which an attachment could be facilitated.

Initially, an EPC instance, e.g., the virtual core network instance 20, can be deployed into a (public or private) cloud instance. This instance can host the Packet Gateway (PGW) and/or Serving Gateway (SGW) functions conventionally used for mobility infrastructure attaches in routing in the EPC core. In a separate instance, e.g., an instance associated with the virtual router device 10, a VM 710 that possesses the kernel plug-in 720 to perform mobility client emulation and routing functions can be deployed.

Subsequently, a directed connection can occur between the two instances referenced above, with one instance being client side and the other instance being the service-side EPC instance. Here, attaches can be instantiated from the client-side VM 710 toward the EPC cloud instance. Once attached, any routing for the network behind the client can be performed by the client-side VM 710 as though it is a router. On the server side, the server-side EPC instance would see the client as a next-hop within one of its own mobile pools within the packet core, with a network behind that mobile for the purposes of routing. As such, the client-side VM 710 could then facilitate routing data traffic according to a network-behind-mobile use case.

Figure 8:
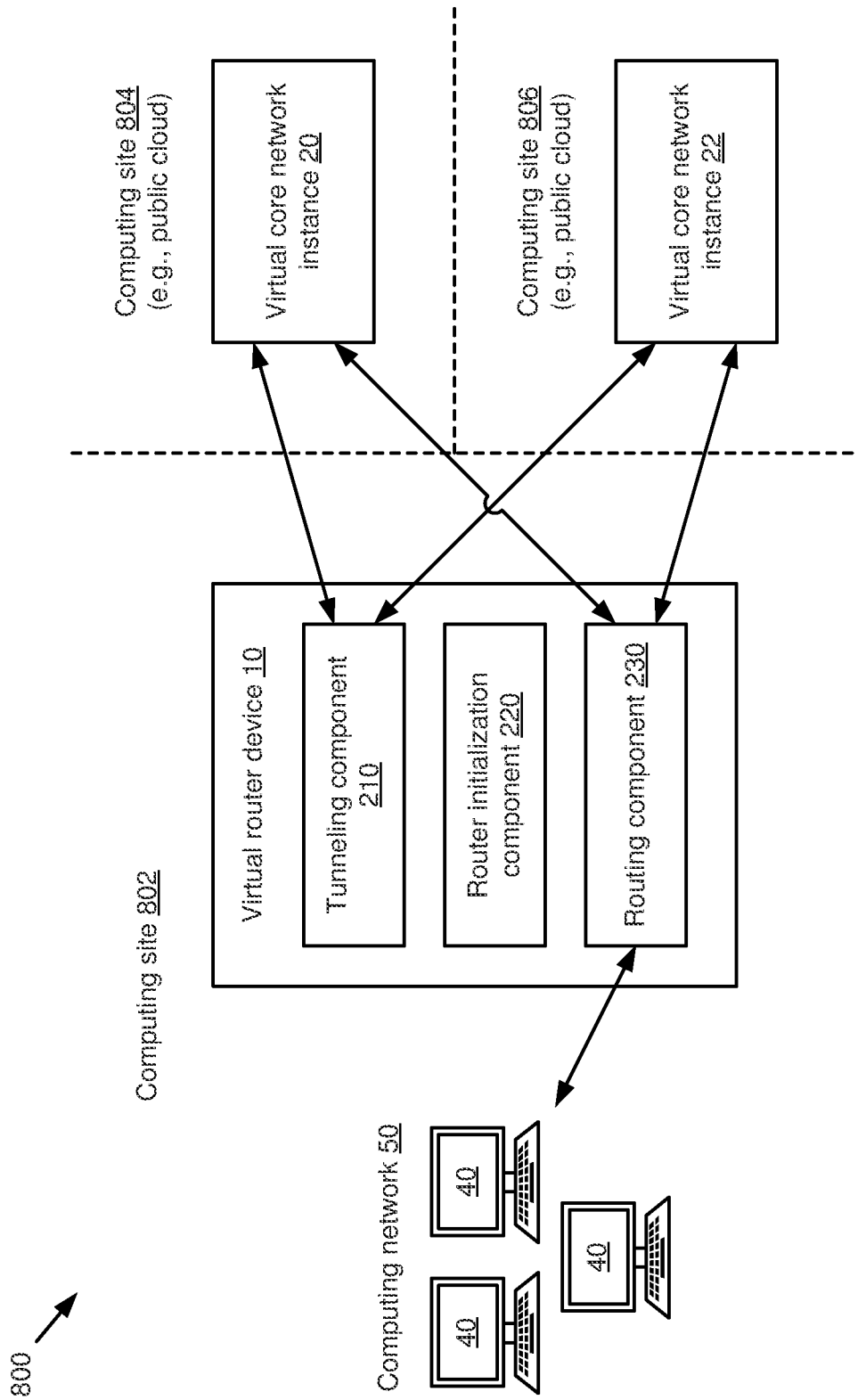
FIG. 8 is a block diagram of a system that facilitates a one-to-many connection scheme that can be utilized by a mobile core cloud connection router in accordance with various aspects described herein.

Turning next to FIG. 8, a block diagram of a system 800 that facilitates a one-to-many connection scheme that can be utilized by a mobile core cloud connection router is illustrated. Repetitive description of like elements employed in other embodiments described herein is omitted for brevity. As shown in FIG. 8, system 800 includes a virtual router device 10 associated with a computing site (e.g., a cloud instance) 802. As further shown, the virtual router device 10, via a tunneling component 210 and routing component 230, can facilitate attachment of the virtual router device 10 as a mobile to multiple virtual core network instances 20, 22 associated with respective computing sites (e.g., public cloud instances) 804, 806 in a similar manner to that described above with respect to FIG. 2. By facilitating a one-to-many connection as shown in FIG. 8, the virtual router device 10 can connect multiple cloud instances to each other on demand in software without utilizing physical infrastructure.

Attachment of the virtual router device 10 to the virtual core network instances 20, 22 shown in FIG. 8 can be performed using GTP and/or another suitable tunneling protocol. In addition, the virtual core network instances 20, 22 can correspond to the same network technology or different technologies. Thus, by way of example, the virtual core network instance 20 could be associated with an LTE network while the virtual core network instance 22 could be associated with a 5G network. Other configurations could also be used.

Figure 9:
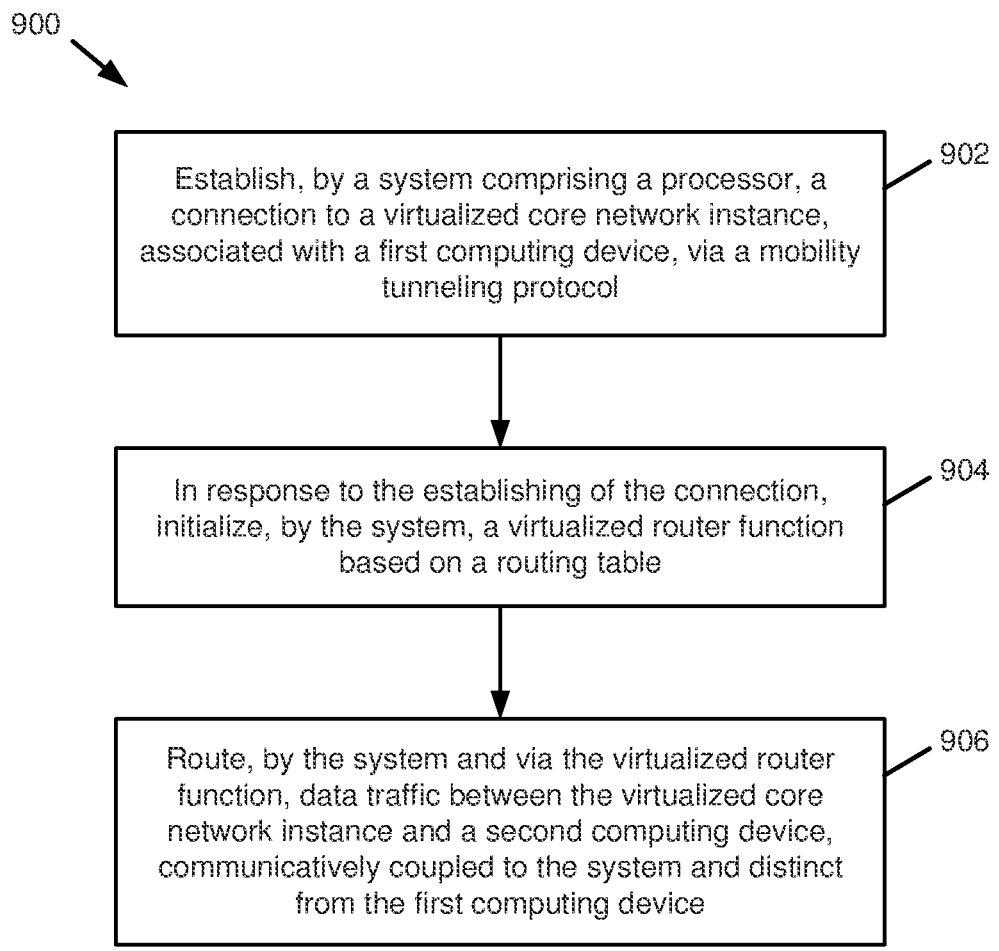
FIG. 9 is a flow diagram of a method that facilitates a mobile core cloud connection router in accordance with various aspects described herein.

With reference now to FIG. 9, a flow diagram of a method 900 that facilitates a mobile core cloud connection router is presented. At 902, a system comprising a processor (e.g., a virtual router device 10 comprising a processor 12, and/or a system including such a device) can establish (e.g., by a tunneling component 210 and/or other components implemented by the processor 12) a connection to a virtualized core network instance (e.g., a virtual core network instance 20), associated with a first computing device (e.g., a computing device associated with a computing site 204), via a mobility tunneling protocol.

At 904, in response to the establishing of the connection at 902, the system can initialize (e.g., by a router initialization component 220 and/or other components implemented by the processor 12) a virtualized router function based on a routing table (e.g., a routing table 310).

At 906, the system can route (e.g., by a routing component 230), via the virtualized router function initialized at 904, data traffic between the virtualized core network instance and a second computing device (e.g., a computing device 40 of a computing network 50), which is communicatively coupled to the system and distinct from the first computing device associated with the virtualized core network instance.

FIG. 9 illustrates a method in accordance with certain aspects of this disclosure. While, for purposes of simplicity of explanation, the method is shown and described as a series of acts, it is noted that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 10:
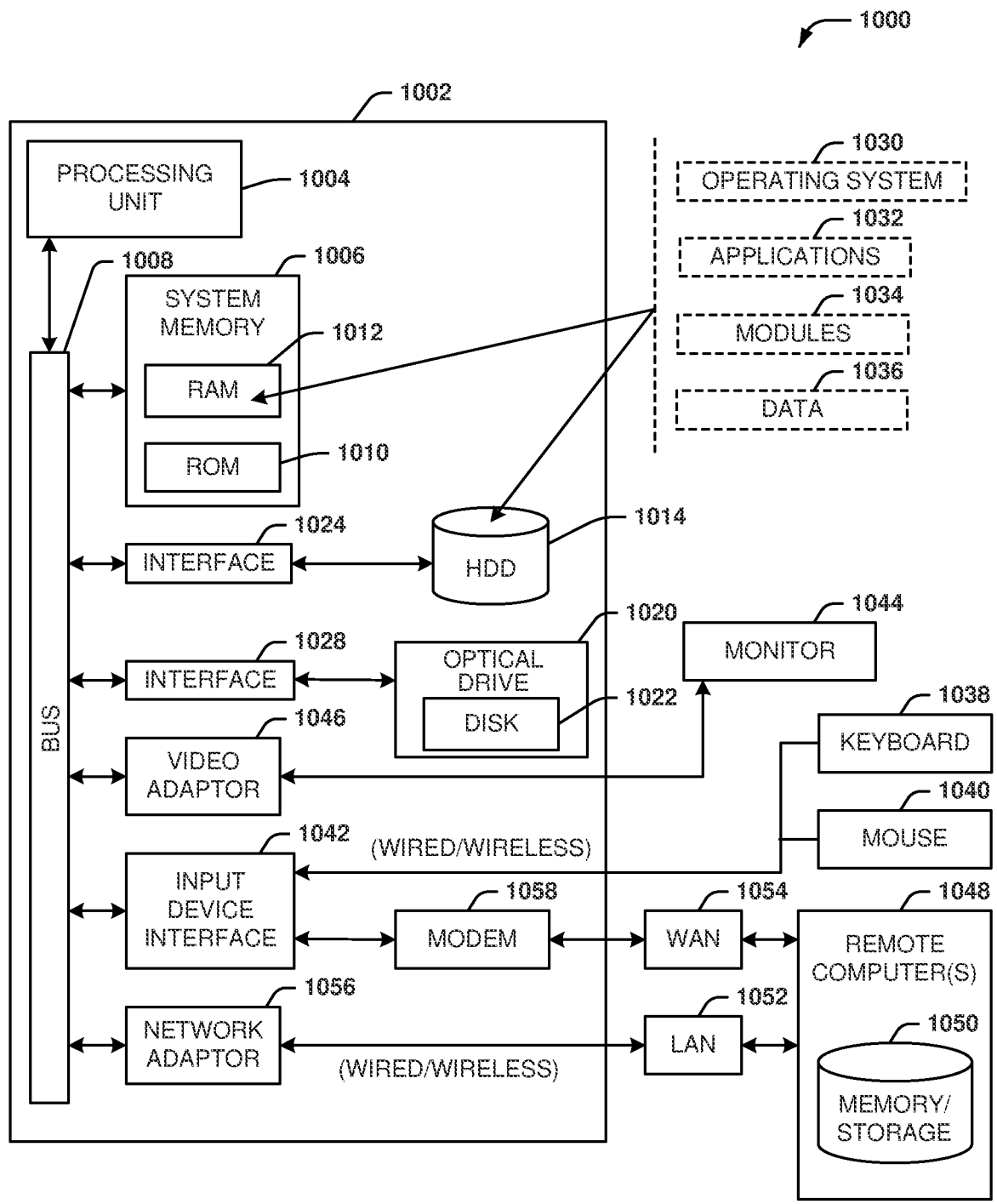
FIG. 10 depicts an example computing environment in which various embodiments described herein can function.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 and an optical disk drive 1020, (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014 and optical disk drive 1020 can be connected to the system bus 1008 by an HDD interface 1024 and an optical drive interface 1028, respectively. The HDD interface 1024 can additionally support external drive implementations via Universal Serial Bus (USB), Institute of Electrical and Electronics Engineers (IEEE) 1394, and/or other interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it is noted by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a USB port, an IR interface, a BLUETOOTH® interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless access point (AP) disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    monitoring, by a system comprising a processor, performance of a first computing device, wherein the monitoring comprises obtaining, by the system, a performance metric associated with the first computing device;
    determining, by the system that the performance metric does not satisfy a performance metric threshold resulting in a determination;
    based on the determination, establishing, by the system, a connection to a virtualized core network instance associated with a second computing device via a mobility tunneling protocol comprising a General Packet Radio Service (GPRS) Tunneling Protocol (GTP);
    configuring, by the system, a quality of service parameter associated with data traffic transmitted over the connection;
    in response to the establishing of the connection, initializing, by the system, a virtualized router function based on a routing table; and
    routing, by the system and via the virtualized router function, the data traffic between the virtualized core network instance and a third computing device, communicatively coupled to the system and distinct from the second computing device, wherein control of the routing of the data traffic is based on the quality of service parameter.

2. The method of claim 1, wherein the establishing of the connection comprises transmitting a connectivity request to the virtualized core network instance, the connectivity request representing the system as a mobile subscriber device.

3. The method of claim 1, wherein the establishing of the connection comprises establishing the connection to the virtualized core network instance without communicatively coupling the system to the virtualized core network instance via network gateway hardware.

4. The method of claim 1, wherein the performance metric comprises a throughput metric.

5. The method of claim 1, wherein the data traffic is associated with an application environment associated with the third computing device.

6. The method of claim 5, wherein the application environment comprises an application selected from a group of applications comprising a diagnostics application, a security analysis application, and a load testing application.

7. The method of claim 5, wherein the data traffic comprises user plane data traffic associated with the application environment.

8. The method of claim 1, wherein the routing of the data traffic comprises routing the data traffic between the virtualized core network instance and the third computing device via a communication protocol associated with the virtualized core network instance.

9. The method of claim 1, wherein the connection is a first connection, wherein the virtualized core network instance is a first virtualized core network instance, and wherein the method further comprises:
    establishing, by the system, a second connection to a second virtualized core network instance, distinct from the first virtualized core network instance, via the mobility tunneling protocol.

10. A system, comprising:
a processor; and
a memory that stores executable instructions that, when executed by the processor, facilitate performance of operations, comprising:
monitoring performance of a first computing device, wherein the monitoring comprises obtaining a performance metric associated with the first computing device;
determining that the performance metric does not satisfy a performance metric threshold resulting in a determination;
based on the determination, connecting, via a mobility tunneling protocol comprising a General Packet Radio Service (GPRS) Tunneling Protocol (GTP), the system to a virtual core network instance implemented by a second computing device resulting in a connection;
configuring a quality of service parameter associated with network traffic transmitted over the connection;
in response to the connecting, initializing a virtual router function based on a routing table; and
routing, via the virtual router function, the network traffic between the virtual core network instance and a third computing device, communicatively coupled to the system and distinct from the second computing device, wherein control of the routing of the network traffic is based on the quality of service parameter.

11. The system of claim 10, wherein the connecting comprises transmitting a connectivity request to the virtual core network instance, and wherein the connectivity request represents the system as a network subscriber device.

12. The system of claim 10, wherein the performance metric comprises a throughput metric.

13. The system of claim 10, wherein the network traffic is associated with an application environment enabled via the third computing device.

14. The system of claim 13, wherein the application environment comprises an application selected from a group of applications comprising a network diagnostics application, a security analysis application, and a load testing application.

15. The system of claim 10, wherein the routing of the network traffic comprises routing the network traffic between the virtual core network instance and the third computing device via a communication protocol associated with the virtual core network instance.

16. A non-transitory machine-readable medium, comprising executable instructions that, when executed by a processor of a processing system, facilitate performance of operations, comprising:
monitoring performance of a first device, wherein the monitoring comprises obtaining a performance metric associated with the first device;
determining that the performance metric does not satisfy a performance metric threshold resulting in a determination;
based on the determination, establishing a connection between a second device and a virtual packet core instance, instantiated on the second device that is distinct from the first device, via a mobility tunneling protocol comprising a General Packet Radio Service (GPRS) Tunneling Protocol (GTP);
configuring a quality of service parameter associated with user plane traffic transmitted over the connection;
in response to the establishing of the connection being determined to be successful, activating a virtual router function at the second device; and
routing, via the virtual router function, the user plane traffic between the virtual packet core instance and a third device that is communicatively coupled to the second device, wherein control of the routing of the user plane traffic is based on the quality of service parameter.

17. The non-transitory machine-readable medium of claim 16, wherein the connecting comprises transmitting a connectivity request to the virtual packet core instance, and wherein the connectivity request represents the second device as a network subscriber device.

18. The non-transitory machine-readable medium of claim 16, wherein the performance metric comprises a throughput metric.

19. The non-transitory machine-readable medium of claim 16, wherein the user plane traffic is associated with an application environment of the third device.

20. The non-transitory machine-readable medium of claim 16, wherein the routing of the user plane traffic comprises routing the user plane traffic between the virtual packet core instance and the third device via a communication protocol associated with the virtual packet core instance.

* * * * *